United States Patent [19]

Sen Gupta

[11] 4,093,540
[45] June 6, 1978

[54] PURIFICATION PROCESS

[75] Inventor: Achintya Kumar Sen Gupta, Schenefeld Bez.Hamburg, Germany

[73] Assignee: Lever Brothers Company, New York, N.Y.

[21] Appl. No.: 741,171

[22] Filed: Nov. 12, 1976

[30] Foreign Application Priority Data

Nov. 13, 1975 United Kingdom ............... 46893/75

[51] Int. Cl.² .............................................. B01D 13/00
[52] U.S. Cl. ............................... 210/23 F; 260/428.5;
426/417
[58] Field of Search .............. 210/259, 23 F; 426/417, 426/254; 260/428.5, 420

[56] References Cited

U.S. PATENT DOCUMENTS

| 3,954,819 | 5/1976 | Husch | 426/417 |
| 3,955,004 | 5/1976 | Strauss et al. | 260/428.5 |
| 3,976,671 | 8/1976 | Husch | 426/417 |

FOREIGN PATENT DOCUMENTS

| 819,157 | 2/1975 | Belgium. | |
| 2,350,544 | 5/1975 | Germany | 210/23 HF |
| 7,505,772 | 11/1975 | Netherlands. | |
| 660,017 | 8/1951 | United Kingdom | 210/23 HF |

*Primary Examiner*—Charles N. Hart
*Assistant Examiner*—E. Rollins Cross
*Attorney, Agent, or Firm*—Michael J. Kelly; Melvin H. Kurtz; James J. Farrell

[57] ABSTRACT

Glyceride oil compositions are refined by contacting them in solution in an organic solvent under pressure with a semi-permeable membrane to separate constituents of different molecular weights into retentate and permeate fractions.

The composition before said separation or at least one of said fractions after said separation is contacted in solution in a non-polar solvent, with a metal oxide or metalloid oxide adsorbent in a column. Optionally the oil can be subjected to a bleaching and/or a deodorizing treatment.

This process allows glyceride oil compositions to be refined by purely physical means, avoiding contact of the composition with chemicals, which may harm the quality of the composition.

44 Claims, No Drawings

PURIFICATION PROCESS

The invention relates to a process for refining glyceride oils. Crude vegetable oils are obtained either by crushing the oil seeds or by extracting the same with solvents, hexane being the most common solvent used. Sometimes crushing and extraction are combined. The crude oils so obtained contain besides neutral triglycerides a host of natural contaminants like phosphatides, sulphurous compounds, free fatty acids, carbohydrates, peptides, oxidised lipids, traces of lower aldehydes and ketones, glycosides of sterols and terpenes, diverse types of dyestuffs etc. These must be removed from the oil in the course of refining in order to render it palatable. So, for example, the phosphatides are removed together with some other impurities in a multistep process by treatment with steam, lye and water-glass solution. In a variation of the above process sometimes steam, phosphoric acid and multiple lye treatments are used to remove the phospholipids from the oil. A part of the phospholipids is recovered as commercial lecithin, while the rest is destroyed chemically. Removal of the free fatty acids is usually carried out by treatment with various concentrations of lye in a large number of process variations. The dyestuffs are destroyed by heating with acid-activated earths, which may also adsorb a part of the dyestuffs as such. Steam deodorisation removes in the last refining step malodorous components, mostly lower aldehydes and ketones.

As will be immediately apparent from this brief description of the refining process of edible oils, all the individual refining operations except the final deodorizing step involve chemical reactions. These unit processes present certain difficulties and have some intrinsic disadvantages which are listed below:

(a) the desliming effect depends on the quality of the crude oil;

(b) about 20–30% of the total phosphatides and about 1% of the neutral oil are lost as inferior quality acid oils;

(c) oxidative or other chemical damages done to the oil during these chemical treatments have injurious effects on the organoleptic quality and keepability of the oils and margarines made therefrom;

(d) considerable amounts of water, lye, acids, soda ash, silicates and other chemicals are needed;

(e) heavily polluted effluents are the result;

(f) some special species of oils as well as some very inferior quality soybean oils cannot be refined satisfactorily at all by these conventional means.

The present invention provides a process for refining crude glyceride oils wherein these disadvantages are avoided. The process according to the invention is basically a physical refining method as distinct from the above-described prior art chemical process. The present process completely avoids contact or treatment with chemicals and even with water, except of course when additionally a deodorizing step is applied. Moreover, it simplifies the entire refining operation enormously.

According to the invention glyceride oil compositions are refined by a process including the steps of:

(a) contacting the composition in solution in an organic solvent as hereinafter defined under pressure with a semi-permeable membrane to separate constituents of different molecular weight into retentate and permeate fractions, (b) contacting the composition or at least one of said fractions in solution in a non-polar solvent with a metal oxide or metalloid oxide adsorbent in a column containing said adsorbent, and thereafter recovering a refined composition from at least one of said fractions by removing solvent therefrom and optionally subjecting said fraction to a conventional deodorization.

The edible glyceride oils which can be treated according to the present invention are all the edible glyceride oils of vegetable and animal origin well-known in the oil and fat industry. Examples thereof are coconut, palm, palmkernel, marine, soyabean, linseed, rapeseed, sunflowerseed, safflowerseed, cottonseed, grapeseed oil and so on. The benefit of the present invention is particularly obtained with soyabean, rapeseed, groundnut, grapeseed, marine oils and used frying oils.

It is to be understood that the steps (a) and (b) above can be carried out both in the order a - b and in the order b - a.

Step (a) has been extensively described in applicant's not prior published Dutch Patent Application No. 7505772, and constitutes a desliming step. In this step crude oil in solution in a suitable solvent, preferably the hexane miscella as it is obtained from the seed extraction, or such a miscella after it has been subjected to step (b), is deslimed by membrane filtration. It removes the phosphatide, sugars, some dyestuffs, peptides and amino acids if present, most of the chemically bound metals like Ca, Mg, Fe, Cu, etc. and some sulphur compounds, if present.

Step (b) has been extensively described in applicant's Belgian Patent Specification No. 819,157. It removes all polar compounds from the miscella as are usually contained therein, including the free fatty acids, oxidised triglycerides, partial glycerides, sterols and glycosides, saponins, most of the dyestuffs including chlorophyl, xanthophylls etc., some sulphurous compounds, if present, etc. The fatty acid esters of sterols, carotenes and tocopherols present in the crude miscella are not removed, however.

When step (a) is carried out first, two fractions are obtained, one containing the oil together with the polar impurities and the other the phosphatides and the other impurities associated with phosphatides. Both of these fractions may then be separately subjected to step (b), the oil fraction giving a purified oil miscella and the phosphatide fraction giving a purified lecithin miscella.

When step (b) is carried out first, step (a) leads directly to a purified oil miscella and a purified lecithin miscella.

Subsequently the solvents are removed from both fractions, e.g. by distillation, to give the purified oil and the purified lecithin.

Preferably the purified and refined oil is finally deodorized in a conventional way, e.g. with steam, to further improve the colour and storage properties. Hence a preferred embodiment of the invention is a three-step process comprising membrane filtration, treatment with adsorbent and steam deodorization.

Further conventional processes like bleaching, hydrogenation, interesterification etc. can be additionally incorporated, if desired after the desliming and adsorption steps, independent of the fact in whichever succession the last two might have been carried out.

In this case the deodorization is preferably carried out as the last process step.

The principle of the desliming process can be described as follows: The miscella obtained after the extraction of soyabeans or rape seeds is a hexane solution of the crude oil, which contains about 0.2%–0.5% free fatty acids, about 1% phosphatides (lecithins) and 28–30% glyceride oil. Lecithins, when dissolved in hexane or a similar hydrocarbon solvent, form molecular aggregates known as micelles with molecular weight as high as 200,000. The molecular weight of neutral triglyceride oil is, for comparison, only about 900. This enormous difference in the molecular weight of these two species can be exploited by using appropriate membranes for pressure-assisted ultrafiltration of the lecithin micelles to yield a permeate fraction consisting of a hexane solution of phosphorous-free glyceride oil. The retentate fraction, which is not permeable to the membrane, consists of a lecithin concentrate together with some glyceride oil, hexane and some other components of the crude oil, viz. carbohydrates, chemically bound metals, smaller peptides and amino acids etc., which form co-micelles with phosphatides. Free fatty acids, partial glycerides, oxidised glycerides, sterols and derivatives do not form micelles and are as such permeable to the membrane. They are contained in the filtrate together with the bulk of the neutral glyceride oil. The unfiltratable retentate, consisting mainly of a concentrated solution of lecithins in hexane, can be further deoiled by diluting it with fresh hexane and subjecting the new diluted solution to renewed ultrafiltration. The new ultrafiltrate is a diluted but deslimed miscella, which can be mixed up with the bulk of the ultrafiltrate already obtained. The new residue yields after distilling off hexane a lecithin comparable to commercial lecithins in chemical compositions, but appreciably better in some important physical characteristics like transparency, pourability etc. By repeating the process of renewed dilution and ultrafiltration, the lecithin can be obtained practically deoiled.

This process offers a number of advantages as compared with the conventional multistep desliming by using steam, soda-waterglass solutions or phosphoric acid and lye at elevated temperatures. For example:

(a) complete desliming (of the order of 99% or more) is achieved in a one step process;
(b) the desliming effect is independent of the crude oil quality;
(c) neither lecithins nor neutral oils are lost
(d) no chemicals are required and as such no chemical injury is done to the oil
(e) the whole process can be operated at ambient temperature
(f) no effluents will result
(g) the whole desliming process is much simplified Any membrane, which is stable to oil and solvent and has the appropriate cut-off limits, may be suitable for the purpose of this invention. Commercially available membranes, which have been found suitable include IRIS 3042 of Messrs. Rhone-Poulenc, France, DIAFLO PM 10 and Hollow Fibre SM 10 of Messrs. Amicon GmbH, Witten (Ruhr) Germany and HFD-180 of Abcor Inc., USA. Elastomeric films of suitable thickness made of commercial silicone rubber are also suitable for this purpose.

The solvent is best selected from those which are comparatively low in molecular weight, not substantially more than that of the glycerides, e.g. 50–200, especially 16–150. The solvents must be non-acidic and non-alcoholic and solvents of low molecular weight, e.g. esters and halohydrocarbons are suitable, but it is particularly advantageous to use as a solvent inert hydrocarbons, particularly alkanes, cycloalkenes or simple aromatic hydrocarbons, e.g. benzene and its homologues containing alkyl substituents having up to 4 carbon atoms, since these in addition to improving the mobility of the oil and hence the flux rate of the liquid system through the membrane, bring about a transformation of any phospholipid molecules present, to form micelles. This phenomenon, which can be described as aggregation of a large number of phospholipid molecules under the influence of the solvent to bodies (micelles) of high molecular weight which can be as high as 200,000 in hexane, greatly increases the effective particle size of the phospholipids, enabling them to be wholly retained by membranes permitting the free passage of the oil and solvent particles present. Moreover, the micelles thus formed appear to embed the comparatively small molecules of other impurities such as sugars, amino acids etc. which might otherwise escape with the oil through the membrane. Suitable hydrocarbons include benzene, toluene and the xylenes, cyclohexane, cyclopentane and cyclopropane, and alkanes, for example, pentanes, hexanes and octanes and mixtures thereof, for example, petroleum ether boiling between the ranges 40° to 120° C or alkenes. While it is preferred in this connection to use hydrocarbons which are normally liquid at ambient temperatures, other solvents may be used which are liquid only under the filtration pressure used. Where the oil is to be separated from the filtrate by evaporating off the solvent, this is preferably of comparatively low boiling point and may in particular be selected to evaporate simply by releasing the filtration pressure. Where phosphatides are not present in significant amounts, other organic solvents as defined e.g. acetone, may be used.

The amount of solvent used to dilute the oil is not critical, bearing in mind the object of diluting to increase mobility and effect micelle formation if any phospholipid is present. Preferably a concentration of oil of from 10 to 50 wt %, preferably 20 to 30 wt %, in the solution is used.

In any event, the solvent adopted, while it may consist of one or more organic liquids, is essentially non-aqueous. Special precautions for removing final traces of water which solvents may contain are not essential, but in general more than about 1% water should not be present.

In carrying out the process of the invention it may be necessary to subject the membrane to be used to treatment rendering it suitable for non-aqueous use. As delivered from the manufacturer, for example, many membranes are already soaked in water or glycerol and must be pretreated successively by contact with water, an intermediate solvent and the diluent solvent to be used in the process. Where the latter is hexane, isopropanol may be used as the intermediate solvent but others will occur to those skilled in the art as suitable. The intermediate solvent must be miscible, if only to a limited extent, both with water and the diluent solvent. It is preferable also to treat the membrane by a similar washing procedure after protracted use, to restore the effectiveness of the membrane.

The temperature at which the filtration is effected is not critical and can vary from about 0° to 70° C, but for the sake of convenience temperatures in the region of ambient, i.e. 10°–40° C, are preferably employed. Increase in temperature improves flux rate but on the other hand may soften the membrane material to an unacceptable degree. Temperatures up to about 70° C are however practical possibilities which may offer advantages in certain circumstances e.g. to assist initial solution. Lower temperatures may be used at which solution persists.

In practice the retentate is preferably recycled continuously in contact with a membrane, until a substantial concentration, at least 2 times and preferably 3-40 times, of impurities is built up in the retentate. Beyond this it may be desirable for maintaining high throughput, to resume with a fresh membrane, or one having different characteristics and/or to operate under difficult conditions, for example after further dilution with the same or a different solvent.

The flow rate of the solution in contact with the membrane is not critical, but in keeping with practice in effecting membrane filtration of aqueous systems, preferably the solution is in turbulent flow to minimise concentration polarisation of retentate at the membrane surface. Means may be provided to ensure turbulence, e.g. spoilers or stirrers. Further particulars about suitable membranes, suitable solvents and about the way this process step can be carried out can be found in applicant's Dutch Patent Application No. 7505772.

The principle of adsorptive refining of the miscella is based on the fact that the miscella, during its passage through a column filled with an appropriate adsorbent, is deprived of contaminants like oxidised and partial glycerides, free fatty acids, sterols and most of their derivatives etc. These contaminants, particularly the oxidised glycerides, which are produced both by enzymatic activity in the seeds and by atmospheric oxidation during the seed processing, are responsible for the undesirable appearance, taste and the keepability of the processed oils. As already mentioned, the removal of these components during conventional refining by treatment with chemicals is either incomplete or they cause further damage to the oil. The adsorptive refining by means of a suitable adsorbent is on the contrary very mild and the removal of the undesirable components rather complete. Some components of the oil, tocopherols and carotenes for example, the presence of which is desirable in the refined oils, are not substantially removed by the adsorptive treatment. No chemicals are used and no effluent problems arise. The taste and the keepability of oils so refined are much superior to those of conventionally refined ones.

The amount of adsorbent to be used is dependent upon a number of factors, e.g. pore size of the adsorbent, type of adsorbent, thickness of the layer in the column, throughput in the column, and so on. In general the ratio of oil to adsorbent varies between 0.3:1 and about 20:1. When step (a) is carried out before step (b) and hence the phosphatide fraction is subjected to step (b) separately, a phosphatide to adsorbent ratio of about 0.3 to 0.5 gives in addition to the purification also a deoiling of the phosphatides. Ratios of 0.5:1 to 20:1 lead to purification together with a partial deoiling.

The adsorbents to be used in the present invention are metal oxides and metalloid oxides, particularly alumina and silica. Particularly silicas in the form of silica gels are especially suitable in the present invention. Mixtures of silicas and aluminas may also be used, as well as mixtures of silicas or aluminas with other adsorbents, provided the amount of silica or alumina is predominant.

The silica or alumina must neither be too fine nor too coarse. In general such silicas or aluminas are used which have an average pore size above 30 A, preferably between 50 and 2000 A. Suitable examples of aluminas and silicas to be used in the present invention are aluminas such as gibbsite or bayerite, and silicas such as silica gels known under the trade names Sorbsil (Joseph Crosfield and Sons, Warrington, UK) and Kieselgel M (Fa. Hermann, Cologne, Germany).

Other examples of suitable aluminas or silicas are Aluminiumoxid 504C (Fluka AG, Buchs, Switerzerland), Kieselgel No. 7734 (E. Merck, Darmstadt, Germany) and Silica Gel Type 62 (Grace GmbH., Bad Homburg, v.d.H, Germany).

It is essential that the edible glyceride oil should be in solution in a non-polar solvent during the adsorption step. Suitable non-polar solvents are petroleum fractions, pentane, hexane, cyclohexane, heptane and the like, including mixtures of various non-polar solvents. Though not necessary, preferably in the adsorption step the same solvent is used as in the desliming step. The concentration of the oil in the solution may vary from 5-90% by weight of the solution, and generally varies from 10-50% by weight of the solution.

The temperature at which the adsorption step may be carried out may vary widely. For most practical purposes the temperature will lie between 0° and 70° C, and preferably between 10° and 40° C. Most preferably ambient temperatures are used.

Further particulars of the adsorption step may be found in applicant's Belgian Patent Specification No. 819,157.

Finally the purified miscella is distilled in order to get rid of the hexane, which might be sent back to the extraction plant. The residue of the distillation is subjected to deodorization. The deodorization may be carried out in a conventional way. The purpose of this step is to remove the volatile impurities such as solvent rests, malodorous components like hydrocarbons, lower aldehydes and ketones or even traces of free fatty acids, which might still be present in the oil after the adsorptive treatment. The deodorized oil, which has excellent taste properties and storage stability, may be used as table oil or in margarine compositions.

EXAMPLE I 15 l of a 33% solution of crude soyabean oil in hexane with a phosphorous content of 990 ppm was deslimed by ultrafiltration through a commercial polyacrylnitrile membrane IRIS 3042 of Messrs. Rhone-Poulenc, France, with a cut-off limit of 25,000 molecular weight, using a commercial ultrafiltration module SM 16525 of Messrs. Sartorius-Membranfilter GmbH, Gottingen, Germany, which accommodated 0.25 m$^2$ of the membrane. Before the membrane was placed in the module, it was washed successively with distilled water, isopropanol and hexane. The crude miscella was pumped through the module at a pressure of 2 kg/cm$^2$ at the rate of 50 l/h. The ultrafiltrate was collected, the non-filtrated miscella being recirculated via one reservoir through the module. The process was arbitrarily stopped when 72.3% of the original volume had already filtered through the membrane. The average flux rate was 30 liters per sq. meter membrane surface per hour. A part of the ultrafiltrate, containing 31% total lipids, was evaporated to yield an oil which was for analysis and refining experiments to be described below. Five liters of the ultrafiltrate (containing 1100 g total lipids) were percolated through a column (diameter = 4 cm) containing 275 g of silica gel (Kieselgel M of Messrs. Herrmann, Cologne, Germany), so that the ratio of total lipid to adsorbent was 4 : 1. After the ultrafiltrate had already percolated through the column, it was washed with 800 ml of pure hexane and the total hexane percolate was evaporated to yield 1040 g refined oil. A small portion of this refined oil was retained for analysis and the rest was deodorised at 0.5 mm and 180° C for 5 hours with 60% water. 50 ml portions of the deodorised oil were filled in 100 ml amber coloured glass bottles with ground glass stoppers with 50 ml headspace filled with air. These oil samples were stored in the dark at room temperature and they were assessed organoleptically on their storage properties by a panel of experts at intervals of two weeks.

For the sake of comparison, the crude oil was conventionally refined, i.e. deslimed with water, neutralised with lye, boiled with soda and water-glass solution, bleached and deodorised. Similarly, the ultrafiltrated oil was neutralised, bleached and deodorised. These oils were also stored and assessed organoleptically as described above.

To examine the effect of bleaching a second charge of ultrafiltrated and silica-treated oil was bleached for 30 minutes at 100° C and 1 mm Hg with 2% Tonsil ACCFF of Messrs. Sudchemie, Munich and subsequently deodorised. As will be apparent from the analyses, the resulting oil was practically colourless, but as far as the organoleptic properties were concerned, it was of the same quality as the charge, which was only ultrafiltrated and silica treated.

| Analyses: | P content | Acid value | Colour Lovibond 2" |
|---|---|---|---|
| Crude oil | 990 ppm | 1.6 | G+ 7R + 0.2B |
| Ultrafiltrated oil | 10 ppm | 1.2 | 20 G+ 5R + 0.2B |
| Ultrafiltrated oil after silica treatment | 4 ppm | 0.1 | 2 G+ 0.2R |
| Ultrafiltrated oil after silica treatment and bleaching | 3 ppm | 0.1 | 0.2 G |

Thin layer chromatographic analysis revealed that both the crude oil and the ultrafiltrated oil were contaminated with partial and oxidised glycerides as well as with free acids. The silica treatment completely removed these compounds.

ORGANOLEPTIC ASSESSMENT

The organoleptic score 8 means an excellent oil, completely neutral in taste. The score 3 means an extremely bad oil, unpalatable and unsuitable for human consumption. The score 5 is the limit of acceptability.

| Score after storage of oil | 0 weeks | 2 weeks | 4 weeks | 6 weeks | 8 weeks | 10 weeks | 12 weeks |
|---|---|---|---|---|---|---|---|
| conventionally refined oil | 6.0 | 5.0 | 4.4 | 4.0 | 3.5 | = | = |
| ultrafiltrated oil, subsequently neutralised, bleached and deodorised | 6.5 | 5.5 | 5.0 | 4.6 | 4.4 | = | = |
| ultrafiltrated, silica treated, and deodorised oil | 6.6 | 6.4 | 6.0 | 5.7 | 5.4 | 5.4 | 5.4 |
| ultrafiltrated silica treated, bleached and deodorised oil | 6.5 | 6.5 | 6.0 | 5.8 | 5.4 | 5.5 | 5.4 |

EXAMPLE II

In this case too the polyacrylnitrile membrane IRIS 3042 of Messrs. Rhone-Poulenc was used. Prior to its use, the membrane was seasonsed by washing successively with water, isopropanol and hexane. The module was of stainless steel construction comprising a spiral channel of 43 cm length of rectangular cross section of dimensions 0.7 × 0.4 cm, provided with a grooved upper plate mating with a lower plate carrying a sintered polytetrafluorethylene support for the membrane. 4 kg of a 30% hexane solution of a crude rapeseed oil were recycled through this spiral plate module at 20° C and a pressure of 2 kg/cm$^2$. The hexane solution was introduced by means of a pressurising pump at the periphery of the spiral channel and the retentate was collected at the centre of the channel through a pressure-reducing valve and recycled. The ultrafiltrate, which permeated through the membrane and percolated through the sintered support, was collected through an opening of the lower plate. The process was stopped when 3200 g of the filtrate (i.e. 80% of the starting solution) was collected. The average flux rate was 41 l/m$^2$ h. 2100 g ultrafiltrate (containing 28.6% total lipids) were percolated through a column containing 150 g silica gel (Kieselgel M of Messrs. Herrmann, Colgate, Germany). After the percolation of the miscella was completed, 450 ml hexane were percolated through the column and the total eluate was evaporated to yield 575 g refined rapeseed oil, which were deodorised for 5 hours at 1 mm Hg and 180° C with 59% water. For comparison the crude rapeseed oil was conventionally refined. Both of these refined oils were stored as described above and assessed organoleptically.

| Analyses | P content | S content | Acid Value | Colour Lovibond 2" |
|---|---|---|---|---|
| Crude oil | 670 ppm | 16 ppm | 1.9 | 70G + 9R + 2B |
| Ultrafiltrated oil | 10 ppm | 9.7 ppm | 1.1 | 40G + 6R + 2B |
| Ultrafiltrated oil after silica treatment | 4 ppm | 0.2 ppm | 0.1 | 20G + 0.5R |

Thin-layer chromatographic examination of the crude and ultrafiltrated oil showed the presence of a host of oxidised glycerides, which were completely removed after silica treatment.

| Score after storage of | Organoleptic assessment | | | | | |
|---|---|---|---|---|---|---|
| | 0 | 2 | 4 | 6 | 8 | 10 |
| oil | weeks | weeks | weeks | weeks | weeks | weeks |
| Conventionally refined oil | 6.0 | 5.0 | 4.0 | 3.5 | = | = |

| Score after storage of oil | Organoleptic assessment | | | | |
|---|---|---|---|---|---|
| | 0 weeks | 2 weeks | 4 weeks | 6 weeks | 8 weeks | 10 weeks |
| Ultra-filtrated silica treated and deodorised oil | 6.0 | 6.0 | 5.8 | 5.6 | 5.6 | 5.4 |

EXAMPLE III 46.6 kg of 31.5% crude soyabean miscella was passed through a column containing 3.7 kg of silica gel slurried in hexane (Kieselgel M of Messrs. Herrmann, Cologne, Germany), the miscella being pumped at the rate of 13 kg/h. After the passage of the miscella through the column, the latter was washed with 10 kg of fresh hexane. 5 kg of the total eluate (oil content 25%) were ultrafiltrated as described in Example I. The ultrafiltrated miscella was distilled to get rid of hexane and the purified and deslimed oil obtained after the removal of hexane was divided into two portions. One of them was deodorised for 5 hours at 230° C at 1 mm Hg with 56% water and the other was bleached for 30 min. at 100° C and 1 mm Hg with 2% Tonsil ACCFF of Messrs. Sudchemie, Munich, and then deodorised as described above. The refined oils were stored and assessed organoleptically as described in Example I.

| Analyses | P content | Acid Value | Colour Lovibond 2" |
|---|---|---|---|
| Crude oil | 680 ppm | 0.9 | 70G + 6R + 0.5B |
| Silica treated oil | 690 ppm | <0.1 | 20G + 0.2R |
| Silica treated and ultrafiltrated oil | 5 ppm | <0.1 | 20G + 0.1R |
| Silica treated, ultrafiltrated and bleached oil | 4 ppm | <0.1 | 1G |

| Score after storage of oil | Organoleptic assessment | | | | | |
|---|---|---|---|---|---|---|
| | 0 weeks | 2 weeks | 4 weeks | 6 weeks | 8 weeks | 10 weeks |
| Crude oil, conventionally refined | 6.0 | 5.0 | 4.0 | 3.5 | — | — |
| silica treated ultrafiltrated and deodorised oil | 6.6 | 6.4 | 6.4 | 5.9 | 5.8 | 5.4 |
| silica treated ultrafiltrated bleached and deodorised oil | 6.2 | 6.0 | 6.0 | 5.8 | 5.8 | 5.5 |

EXAMPLE IV 4 liters of a 30% solution of crude soyabean oil in technical hexane were ultrafiltrated through a polysulfon membrane of the trade mark DIAFLO PM 10 of Messrs. Amicon fitted in a module 401 S of Messrs. Amicon which was connected to a 4 liter reservoir. The applied pressure was 6 kg/cm$^2$ and the temperature of the operation was 20° C. After about 3.9 liters ultrafiltrate were obtained, the process was stopped. Half of the retentate was evaporated to give about 20 g of transparent lecithin. The other half of the retentate was percolated through a column containing 40 g silica gel (Kieselgel M) of Messrs. Herrmann, Cologne. After the percolation of the retentate solution was completed, the silica gel column was eluted with 100 ml hexane and the total eluate evaporated to give about 12 g deoiled and purified lecithin. The lecithins obtained by ultrafiltration and by the combination of ultrafiltration and silica-treatment and also a sample of commercial lecithin obtained from the same batch of crude oil by the conventional hydration technique were analysed. The analyses are shown below:

| | Commercial lecithin | lecithin obtd. by ultra-filtr. | lecithin obtd. by ultrafiltr. + silica-treatment |
|---|---|---|---|
| Phosphorus content | 1.96 % | 2.03 % | 3.14 % |
| Aceton-insoluble | 58 % | 60.2 % | 99.2 % |
| oil content* | 42.5 % | 40.5 % | <1 % |
| metal content | | | |
| Fe | 68 ppm | 76 ppm | 35 ppm |
| Cu | 10 ppm | 10 ppm | 1 ppm |
| Ca | 0.1 % | 0.3 % | 0.23 % |
| Mg | 0.13 % | 0.22 % | 0.12 % |

*determined according to Z.Lebensm.Unters.-Forsch.158, 71 (1975)

The above table shows that the lecithin obtained by the combination of ultrafiltration and silica-treatment is very high in its P-content and is practically pure lecithin, free from non-phosphorus lipids and oils as is indicated by its very high content of phosphorus and acetone-insoluble part. It had a nut-like pleasant taste in contrast to the seed-like and slightly rancid taste of the two other samples.

100 g of the ultrafiltrated solution was evaporated to yield 28.3 g oil which was kept back for analyses. The rest of the ultrafiltrated solution was percolated through a column containing 200 g of silica gel (Kieselgel M of Messrs. Herrmann, Cologne). After the percolation of the oil solution was complete, 600 ml hexane were allowed to pass through the same column. The percolate was mixed up with the hexane eluate and the mixture stripped under reduced pressure to yield about 780 g purified oil which were deodorized conventionally 5 h at 230° C and 1 mm Hg using 51% water. For comparison, the same batch of crude oil was refined using conventional techniques, viz. delecithination by hydration at 80° C, alkaline neutralization, boiling with soda and waterglass, bleaching and deodorization. Both oil samples were stored and assessed organoleptically as previously described. The results are shown below:

| score after storage of oil | 0 weeks | 2 weeks | 4 weeks | 6 weeks | 8 weeks | 10 weeks | 12 weeks | 14 weeks |
|---|---|---|---|---|---|---|---|---|
| conventionally refined oil | 6.0 | 5.5 | 5.3 | 5.1 | 4.3 | 4.0 | — | — |
| ultrafiltrated and subsequently silica-treated | 6.7 | 6.5 | 6.7 | 6.1 | 5.6 | 6.1 | 5.6 | 5.0 |

| score after storage of oil | 0 weeks | 2 weeks | 4 weeks | 6 weeks | 8 weeks | 10 weeks | 12 weeks | 14 weeks |
|---|---|---|---|---|---|---|---|---|
| and deodorized oil | | | | | | | | |

Chemical analyses of the crude oil, ultrafiltrated oil and ultrafiltrated and silica-treated oil are given below:

| | P-content | Acid value | Metal content(ppm) Ca | Mg | Fe | Cu | Tocopherols |
|---|---|---|---|---|---|---|---|
| crude oil | 885 ppm | 1.5 | 136 | 89.2 | 1.09 | 0.04 | 1250 |
| ultrafiltrated oil | 4 ppm | 0.6 | 2.9 | 1.5 | 0.05 | 0.04 | 1110 |
| ultrafiltrated and silica-treated oil | 3 ppm | <0.1 | 0.7 | 0.08 | <0.04 | <0.04 | 1050 |
| conventionally refined oil | 4 ppm | <0.1 | 1.9 | 1.2 | 0.8 | 0.04 | 1100 |

TLC-analysis revealed that the ultrafiltrated and silica-treated oil was completely free of oxidised triglycerides, whereas the conventionally refined oil contained appreciable amounts of them.

The above results show that the combination of ultrafiltration and silica-treatment is very effective in removing practically all undesirable components from a crude oil to yield a final raffinate of excellent organoleptical keepability. The tocopherols (vitamin E), whose retention in oil is desired, are not removed.

EXAMPLE V

A 29.3% hexane solution of a crude soyabean oil was ultrafiltrated through the polyacrylnitrile membrane IRIS 3042 of Messrs. Rhone-Poulenc using the spiral plate module as described in Example II. The temperature, however, was 60° C and the applied pressure 4 kg/cm². The ultrafiltration was continued till 93.4% of the initial solution had passed through the membrane. 2000 g of the ultrafiltrate were percolated through 150 g silica gel (Kieselgel M of Messrs. Herrmann, Cologne). After the percolation of the miscella was complete, 450 ml hexane were percolated through the column and the total eluate evaporated to yield 545 g refined soyabean oil, which was deodorized 5 hours at 1 mm Hg and 230° C with 52% water. For comparison the same batch of crude soyabean oil was conventionally refined as described previously. Both refined oils were stored and assessed organoleptically.

| score after storage of oil | organoleptic assessment | | | | | | |
|---|---|---|---|---|---|---|---|
| | 0 weeks | 2 weeks | 4 weeks | 6 weeks | 8 weeks | 10 weeks | 12 weeks |
| conventionally refined oil | 4.4 | 4.2 | — | — | — | — | — |
| ultrafiltrated silica-treated and deodorised oil | 6.5 | 6.0 | 6.4 | 6.2 | 6.2 | 6.1 | 5.9 |

Thin layer chromatographic examination showed that the conventionally refined oil was heavily contaminated with oxidised triglycerides, whereas the ultrafiltrated and silica-treated oil was free of them.

EXAMPLE VI

A 30% solution of crude ground nut oil in hexane was ultrafiltrated at 60° C and a pressure of 4 kg/cm³ through the polyacrylnitrile membrane IRIS 3042 as described in Example II. The ultrafiltration was stopped when 86% of the initial miscella was obtained as ultrafiltrate. The average fluxrate was 52 l/m².h. 1840 g ultrafiltrated miscella were percolated through 150 g silica gel as described previously. The refined oil (596 g) was deodorized at 230° C and 1 mm Hg using 51% water. For the sake of comparison, the same batch of the crude ground nut oil was conventionally refined. Both refined oils were stored and assessed organoleptically as previously described.

| Analyses | P-content | Acid value | $E_{1cm}^{1\%}$ 232 nm | 272 nm |
|---|---|---|---|---|
| crude ground nut oil | 167 ppm | 1.6 | 2.86 | 4.96 |
| conventionally refined oil | 4 ppm | <0.1 | 2.74 | 5.75 |
| ultrafiltrated and silica-refined oil | 2 ppm | <0.1 | 1.38 | 0.12 |

The high extinction coefficients $E_{1cm}^{1\%}$ at 232 nm and 272 nm of the crude and the conventionally refined oils show their high degree of oxidation, which is low indeed in the ultrafiltrated and silica-treated oil. These results were confirmed by thin layer chromatographic analyses.

| score after storage of the oil | Organoleptic assessments | | | | | |
|---|---|---|---|---|---|---|
| | 0 weeks | 2 weeks | 4 weeks | 6 weeks | 8 weeks | 10 weeks |
| conventionally refined oil | 5.0 | 5.0 | 4.9 | 4.1 | — | — |
| ultrafiltrated silica treated and deodorized oil | 6.4 | 5.7 | 5.4 | 5.7 | 5.1 | 5.0 |

I claim:

1. A process for refining crude glyceride oil comprising the steps of:
   (a) separating different molecular weight constituents of said crude oil into retentate and permeate fractions by ultrafiltering, under pressure, through a semipermeable membrane, a solution containing said crude oil in an organic solvent in which phospholipid micelles are formed; and
   (b) passing, in solution in a non-polar solvent, the constituents contained in said permeate fraction through an adsorbant, wherein said adsorbant is a metal oxide or metalloid oxide adsorbant with an average pore size of 30 to 2,000 A and is selected from the group consisting of silicas, aluminas and mixtures thereof and further wherein said permeate fraction solution contains 5 to 90 percent by weight of oil.

2. The process according to claim 1 further comprising a bleaching treatment step.

3. The process according to claim 1 further comprising a deodorizing step.

4. The process according to claim 1 wherein the weight ratio of the oil contained in said permeate fraction solution to said adsorbant is 0.3:1 to 20:1.

5. The process according to claim 1 wherein said crude oil solution contains 10 to 50 percent by weight oil.

6. The process according to claim 1 wherein said process is carried out at a temperature of 0° to 70° C.

7. The process according to claim 1 wherein said organic solvent in which phospholipid micelles are formed and said non-polar solvent are the same.

8. The process according to claim 7 wherein said solvent is selected from the group consisting of inert hydrocarbons, halogenated inert hydrocarbons and mixtures thereof.

9. The process according to claim 8 wherein said solvent is hexane.

10. The process according to claim 1 wherein
    (a) the weight ratio of the oil in said permeate fraction solution to said adsorbant is 0.3:1 to 20:1;
    (b) said crude oil solution contains 10 to 50 percent by weight oil;
    (c) said process is carried out at a temperature of 0° to 70° C; and
    (d) said organic solvent in which phospholipid micelles are formed is hexane.

11. Refined glyceride oil by the process according to claim 1.

12. Refined glyceride oil by the process according to claim 10.

13. A process for refining purified lecithin from crude glyceride oil comprising the steps of:
    (a) separating different molecular weight constituents of said crude oil into retentate and permeate fractions by ultrafiltering, under pressure, through a semipermeable membrane, a solution containing said crude oil in an organic solvent in which phospholipid micelles are formed; and
    (b) passing, in solution in a non-polar solvent, the constituents contained in said retentate fraction through an adsorbant, wherein said adsorbant is a metal oxide or metalloid oxide adsorbant with an average pore size of 30 to 2,000 A and is selected from the group consisting of silicas, aluminas and mixtures thereof.

14. The process according to claim 13 wherein the weight ratio of the oil contained in said permeate fraction solution to said adsorbant is 0.3:1 to 20:1.

15. The process according to claim 13 wherein said crude oil solution contains 10 to 50 percent by weight oil.

16. The process according to claim 13 wherein said process is carried out at a temperature of 0° to 70° C.

17. The process according to claim 13 wherein said organic solvent in which phospholipid micelles are formed and said non-polar solvent are the same.

18. The process according to claim 17 wherein said solvent is selected from the group consisting of inert hydrocarbons, halogenated inert hydrocarbons and mixtures thereof.

19. The process according to claim 18 wherein said solvent is hexane.

20. The process according to claim 13 wherein
    (a) the weight ratio of the oil in said permeate fraction solution to said adsorbant is 0.3:1 to 20:1;
    (b) said crude oil solution contains 10 to 50 percent by weight oil;
    (c) said process is carried out at a temperature of 0° to 70° C; and
    (c) said organic solvent in which phospholipid micelles are formed is hexane.

21. Refined lecithin by the process according to claim 13.

22. Refined lecithin by the process according to claim 20.

23. A process for refining purified glyceride oil from crude glyceride oil comprising the steps of:
    (a) passing said crude oil, in solution in a non-polar solvent, wherein said solution contains 5 to 90 percent by weight oil, through an adsorbant, wherein said adsorbant is a metal oxide or metalloid oxide adsorbant with an average pore size of 30 to 2,000 A and is selected from the group consisting of silicas, aluminas and mixtures thereof;
    (b) separating different molecular weight constituents of the eluate into retentate and permeate fractions, by ultrafiltering, under pressure, through a semipermeable membrane, a solution of said constituants in an organic solvent in which phospholipid micelles are formed; and
    (c) removing said solvent from said permeate fraction.

24. The process according to claim 23 further comprising a bleaching treatment step.

25. The process according to claim 23 further comprising a deodorizing step.

26. The process according to claim 23 wherein the weight ratio of the oil contained in said permeate fraction solution to said adsorbant is 0.3:1 to 20:1.

27. The process according to claim 23 wherein said crude oil solution contains 10 to 15 percent by weight oil.

28. The process according to claim 23 wherein said process is carried out at a temperature of 0° to 70° C.

29. The process according to claim 23 wherein said organic solvent in which phospholipid micelles are formed and said non-polar solvent are the same.

30. The process according to claim 29 wherein said solvent is selected from the group consisting of inert hydrocarbons, halogenated inert hydrocarbons and mixtures thereof.

31. The process according to claim 30 wherein said solvent is hexane.

32. The process according to claim 23 wherein
(a) the weight ratio of the oil in said permeate fraction solution to said adsorbant is 0.3:1 to 20:1;
(b) said crude oil solution contains 10 to 50 percent by weight oil;
(c) said process is carried out at a temperature of 0° to 70° C; and
(c) said organic solvent in which phospholipid micelles are formed is hexane.

33. Refined glyceride oil by the process according to claim 23.

34. Refined glyceride oil by the process according to claim 32.

35. A process for refining purified lecithin from crude glyceride oil comprising the steps of:
(a) passing said crude oil, in solution in a non-polar solvent, wherein said solution contains 5 to 90 percent by weight oil, through an adsorbant, wherein said adsorbant is a metal oxide or metalloid oxide adsorbant with an average pore size of 30 to 2,000 Å and is selected from the group consisting of silicas, aluminas and mixtures thereof;
(b) separating different molecular weight constituents of the eluate into retentate and permeate fractions, by ultrafiltering, under pressure, through a semipermeable membrane, a solution of said constituants in an organic solvent in which phospholipid micelles are formed; and
(c) removing said solvent from said permeate fraction.

36. The process according to claim 35 wherein the weight ratio of the oil contained in said permeate fraction solution to said adsorbant is 0.3:1 to 20:1.

37. The process according to claim 35 wherein said crude oil solution contains 10 to 50 percent by weight oil.

38. The process according to claim 35 wherein said process is carried out at a temperature of 0° to 70° C.

39. The process according to claim 35 wherein said organic solvent in which phospholipid micelles are formed and said non-polar solvent are the same.

40. The process according to claim 39 wherein said solvent is selected from the group consisting of inert hydrocarbons, halogenated inert hydrocarbons and mixtures thereof.

41. The process according to claim 40 wherein said solvent is hexane.

42. The process according to claim 35 wherein
(a) the weight ratio of the oil in said permeate fraction solution to said adsorbant is 0.3:1 to 20:1;
(b) said crude oil solution contains 10 to 50 percent by weight oil;
(c) said process is carried out at a temperature of 0° to 70° C; and
(c) said organic solvent in which phospholipid micelles are formed is hexane.

43. Refined lecithin by the process according to claim 35.

44. Refined lecithin by the process according to claim 42.

* * * * *